March 10, 1925. 1,529,579
C. E. DORSEY
STUMP PULLER
Filed June 28, 1923 3 Sheets-Sheet 1
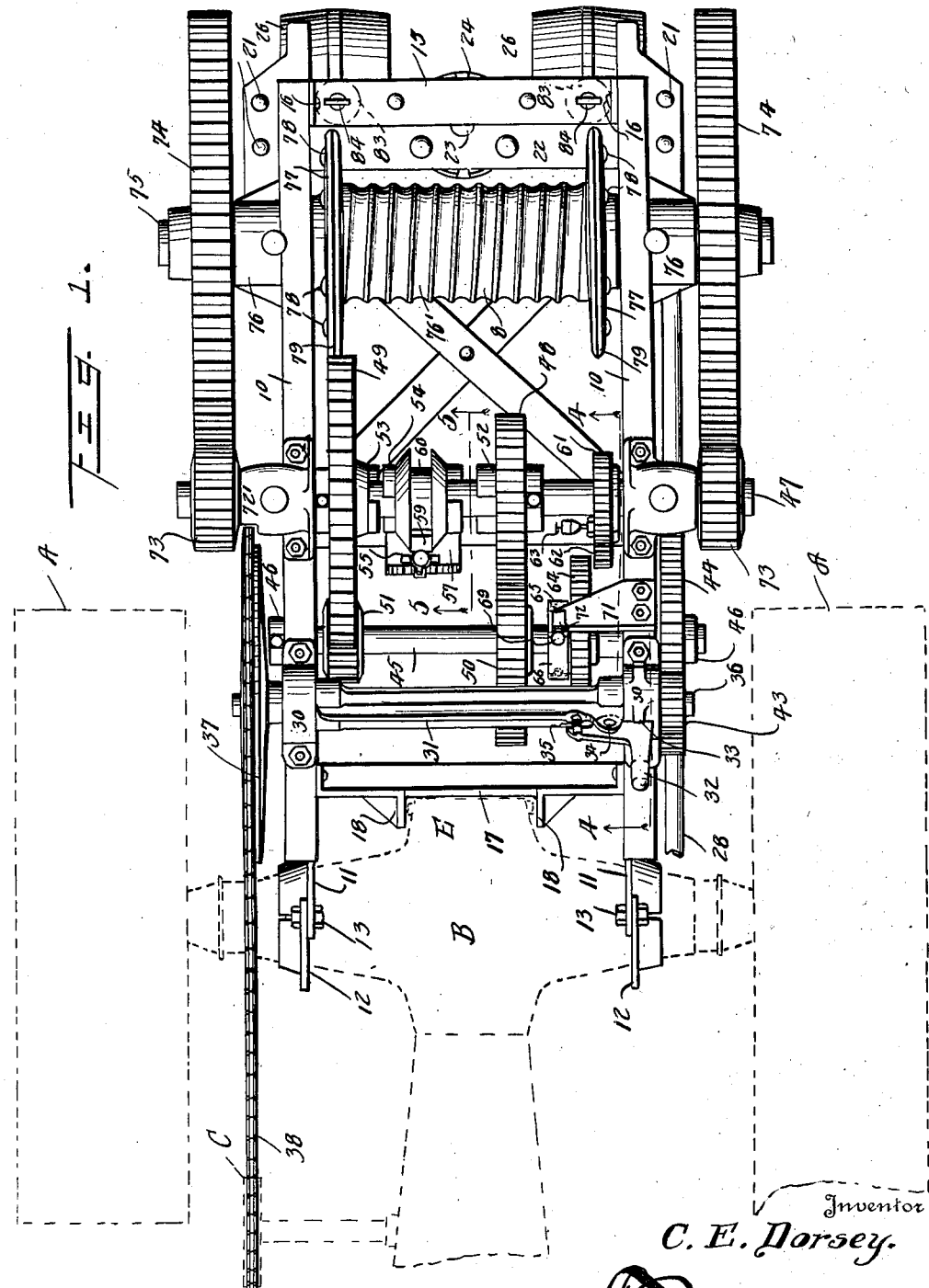
Inventor
C. E. Dorsey.
By
Attorney March 10, 1925.
C. E. DORSEY
STUMP PULLER
Filed June 28, 1923   3 Sheets-Sheet 2
1,529,579
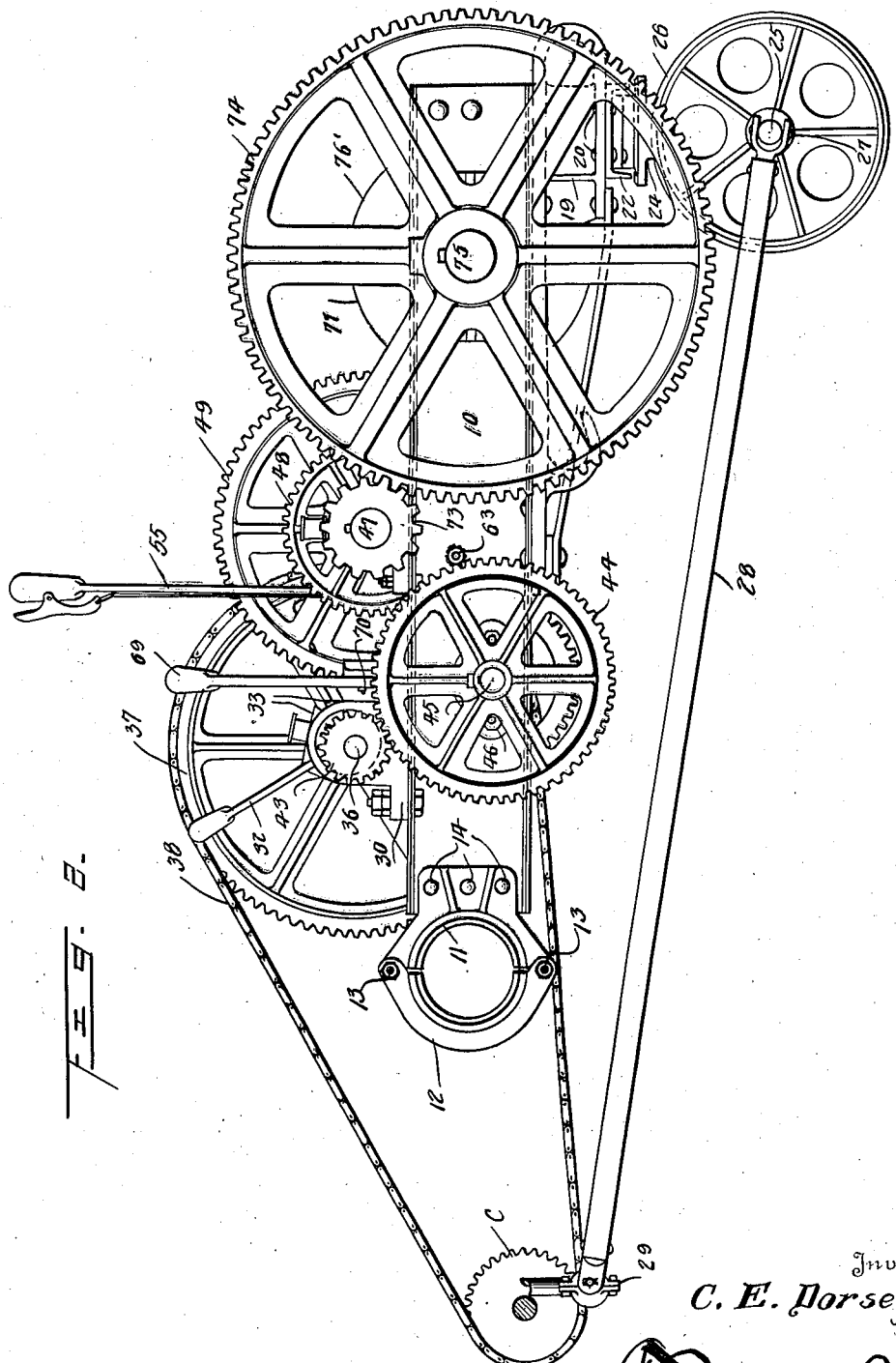
Inventor
C. E. Dorsey.
By 
Attorney March 10, 1925.
C. E. DORSEY
STUMP PULLER
Filed June 28, 1923   3 Sheets-Sheet 3
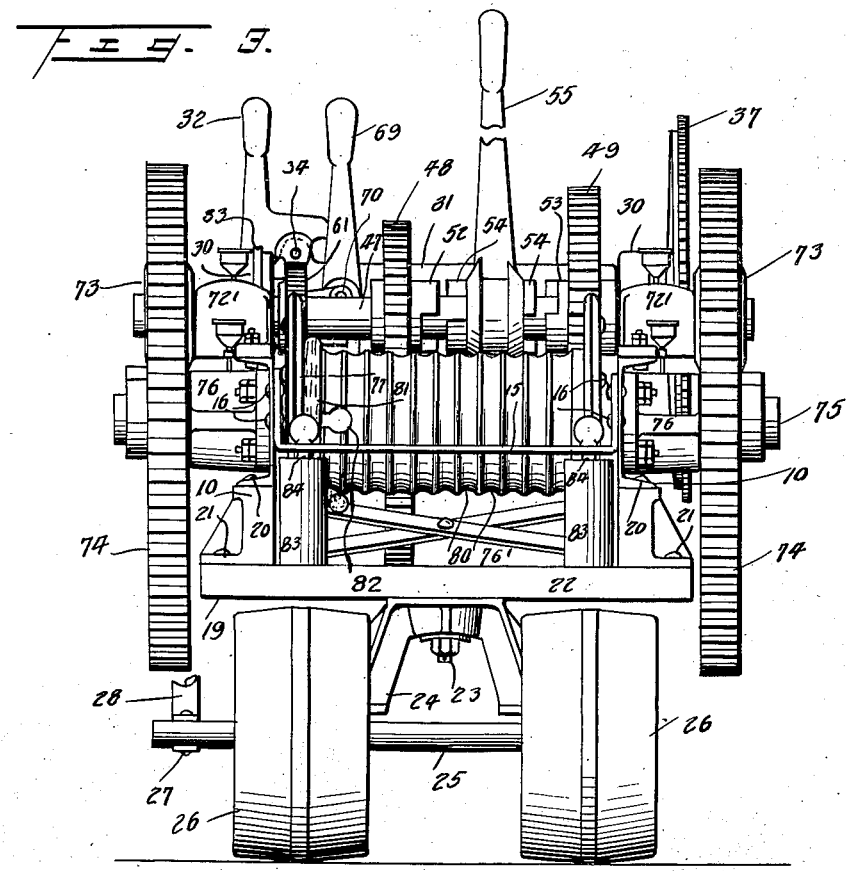
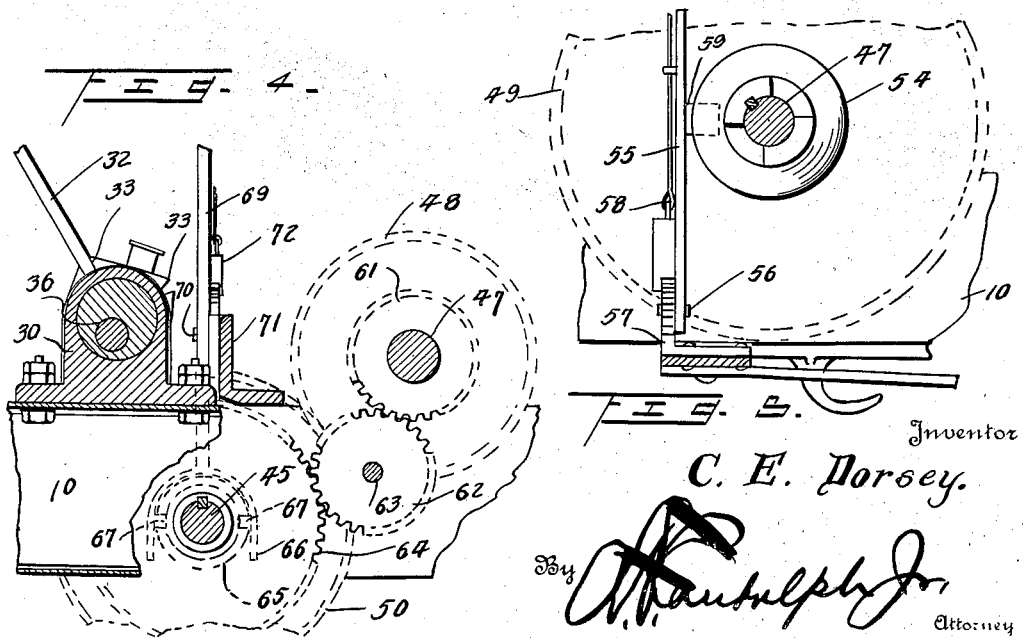
Inventor
C. E. Dorsey.
By
Attorney Patented Mar. 10, 1925.

1,529,579

UNITED STATES PATENT OFFICE.

CLAUDE E. DORSEY, OF ELBA, ALABAMA.

STUMP PULLER.

Application filed June 28, 1923. Serial No. 648,302.

*To all whom it may concern:*

Be it known that I, CLAUDE E. DORSEY, a citizen of the United States, residing at Elba, in the county of Coffee and State of Alabama, have invented certain new and useful Improvements in Stump Pullers; and I do hereby declare the following to be a full, clear, and exact description of the invention, such as will enable others skilled in the art to which it appertains to make and use the same.

This invention relates to a stump puller primarily in the nature of an attachment for tractors.

It is aimed to generally improve and render an attachment of this character more efficient and still maintain its manufacturing cost at a minimum.

It is further aimed to provide a construction in which the driving and pulling strain on the power drum will be equalized, in which the attachment is wheeled, may be driven at different speeds, may be efficiently steered through the steering of the tractor to which it is connected and to provide a novel means for throwing the operating parts into and out of gear.

Various additional objects and advantages will become apparent from a consideration of the description following taken in connection with accompanying drawings illustrating an operative embodiment.

In said drawings:—

Figure 1 is a plan view of the attachment to a tractor, the latter being shown fragmentarily;

Figure 2 is a view of the parts of Figure 1 in side elevation;

Figure 3 is a rear elevation;

Figure 4 is a cross sectional view taken on the line 4—4 of Figure 1, and

Figure 5 is a cross sectional view taken on the line 5—5 of Figure 1.

Like reference characters designate like or similar parts in the different views.

The fragmentary parts of a tractor shown illustrate connection and use of the attachment and consist of rear wheels A which are positively driven by a rear axle journaled in a housing B. Such rear axle or any appropriate part of the transmission of the tractor is adapted to drive a short laterally extending shaft on which a sprocket wheel C is keyed. Housing B has a central enlargement as at E.

The attachment consists of a suitable frame which particularly has spaced longitudinal side beams 10 which may be of any suitable material for instance metallic I beams. Attaching collars consisting of sections 11 and 12 embrace the housing B to pivotally connect said beams 10 thereto. The sections 11 and 12 are detachably bolted or otherwise fastened together as at 13 and the sections 11 may be riveted as at 14 to the beams 10. Beams 10 at their rear are spanned by a brace 15 which is riveted thereto as at 16. Adjacent the forward ends, beams 10 are spanned by a cross beam 17 which has forwardly extending lugs 18 adapted to receive the enlargement E between the same whereby it tends to prevent undue lateral motion of the attachment.

Side beams 10 have suitable sub-structures as at 19 riveted thereto as at 20 and at 21 to a rear cross beam 22. Pivotally connected to the cross beam 22 as by a key bolt 23 is a U-shaped hanger 24 mounting an axle 25 on which ground wheels 26 are journaled. Axle 25 has suitable flexible substantially universal connection as at 27 with a steering bar 28 disposed at one side of the machine and adapted for connection by means of a clamp or the like at 29, to steering mechanism of the tractor so that the steering movement of the tractor will be imparted to the bar 28 and thus to the wheels 26 since the hanger 24 is swiveled through the key bolt 23.

Suitable bearings 30 are fastened on the side beams 10 and in the same an arbor 31 is journaled for adjustment to different positions but normally adapted to be stationary and so secured by means of a latch lever 32 disposable intermediate teeth or projections 33 on one of the bearings 30. The lever 32 is pivoted at 34 to the arbor and is urged into coaction with the teeth 33 by a spring 35 of the expansive type engaging the free end of the lever and the arbor. The lever 32 is adapted to be swung against the tension of spring 35 in order to release it from the teeth 33 and then swung in a path at a right angle to its axis so as to adjust the position of the arbor. Eccentrically journaled in the arbor 31 is a driving shaft 36 which carries a sprocket wheel 37 at one end. Trained over the sprocket wheel 37 is a sprocket chain 38 which also passes over the sprocket wheels C and is driven thereby. Thus the shaft 36 is driven from the transmission mechanism of the tractor.

At the end of shaft 36 opposite to sprocket chain 37 is a relatively small spur gear wheel or pinion 43 which is adapted to mesh with a larger gear wheel or pinion 44 carried by an intermediate shaft 45 journaled in suitable bearings 46 secured to the side beams 10. Through the adjustment of the arbor 31, and the eccentric mounting of the shaft 36 therein, the gear wheel 43 may be thrown into and out of mesh with the gear wheel 44.

A driven shaft 47 is adapted to receive its power from the shaft 45 and it has gear wheels 48 and 49 loosely journaled on shaft 47 so as to normally turn independently thereof. These gear wheels differ in size and mesh with gear wheels 50 and 51, respectively, also differing in size and keyed to the shaft 45. Extending outwardly from the hubs of the gears 48 and 49 toward each other, are clutch members 52 and 53, respectively adapted to be selectively engaged by a suitable clutch 54 rotatable with its shaft 47 but adapted for sliding movement thereon in order to selectively engage said clutches 52 and 53 to drive the shaft 47 at different speeds due to the difference in the gear. Clutch 54 is movable by a lever 55 pivoted at 56 to a bracket 57 and adapted to be secured thereto in neutral and locked position through the medium of a plunger or other lock device 58. This lever has a projection 59 which extends into an annular groove 60 of the clutch 54.

A gear wheel 61 is keyed on the driven shaft 47 and meshes with a gear wheel 62 journaled on a counter shaft 63 fastened to one of the side beams 10. A gear wheel 64 is adapted to mesh with the gear wheel 62 at times, when the clutch 54 is neutral with respect to the gears 48 and 49 in order to drive its shaft 47 in reverse direction to the other gearings and the shaft 47 at substantially the same speed of rotation as shaft 45. Gear wheel 64 is slidable on the shaft 45 and splined thereto so as to turn therewith. Gear 64 has a collar 65 provided with an annular groove 66 into which the ends 67 of a yoke 68 extend and which yoke is part of a lever 69 pivoted at 70 to a bracket 71 fastened to one of the side beams 10. Suitable lock mechanism 72 is provided to normally maintain the lever 69 and accordingly gear wheel 64 in a neutral position and also to maintain the same locked when desired in engagement with the gear wheel 62.

Shaft 47 is journaled in bearings 72 suitably fastened on the side beams 10. Pinions or spur gear wheel 73 are keyed to shaft 47 in mesh with relatively large gear wheels 74 carried by a drum shaft 75 journaled in suitable bearings 76 fastened to the side beams 10. Suitably fastened on the shaft 75 is a power drum 76' which may consist of a spool like body having flanges 77 riveted or otherwise fastened at 78 to head 79 directly rigidly fastened to shaft 75. The main portion of the drum is grooved as at 80 for coaction with a power cable 81 which may be fastened to the drum by means of a knot or the like coacting with a keyhole slot 82 of the drum. The drum may be made of sheet metal suitably stamped into shape and making it substantially hollow. Guide rollers 83, for the cable 81, are journaled on upstanding shafts 84 fastened in bar 15 and beam 22.

In using the attachment, the same is connected to the tractor by securing the collars by means of bolts 13 about the housing B and connecting the chain 38 with the sprocket wheel D. The chain 38 accordingly drives the gear wheel 37 and shaft 36. With gear wheel 43 in mesh with gear wheel 44, depending upon the adjustment of the arbor 31 under control of latch lever 32, shaft 45 is driven. From the shaft 45, shaft 47 may be driven at different speeds with the clutch 54 in engagement with the gear wheels 48 and 49, respectfully, since they are in mesh with gear wheels 50 and 51. If desired, while the clutch 54 is neutral with respect to the gear wheels 48 and 49, gear wheel 64 may be slid into mesh with the gear wheel 62. Through the connection of the various gears, shaft 47 is driven which through the medium of the gear wheels 73 drives the gears 74 which in turn drive the shaft 75 and the drum 76' carried thereby. As the cable 81 is fastened to the stump to be pulled and also to the drum at the keyhole slot 82, such cable is wound about the drum to thereby pull the stump. Should it be necessary to pay out a portion of the cable by power, this end may be brought about through the meshing of the gears 64 and 62.

Changes in the details may be resorted to provided they fall within the spirit and scope of the invention.

I claim as my invention:—

1. An attachment of the class described having a driving shaft, an endless chain to drive said shaft from the transmission mechanism of a tractor, an arbor in which said shaft is eccentrically journaled, means operable to vary the position of the arbor, a power drum, means to drive said power drum from said shaft, and the adjustment of said arbor controlling the driving of said drum and the tension of the chain.

2. An attachment of the class described having a driving shaft, means to drive said shaft from the transmission mechanism of a tractor, an arbor in which said shaft is eccentrically journaled, means to vary the axial position of the arbor, a gear wheel on said shaft, a power drum for the attachment, means to drive said power drum from said gear wheel, and the adjustment of said arbor controlling the meshing and demeshing of the first gear wheel with said means and the tension of the first mentioned driving means.

3. An attachment of the class described having a driving shaft, an intermediate shaft, means to drive the intermediate shaft from the driving shaft, a driven shaft, gear wheels normally loose on the driven shaft, a clutch driven by the driven shaft and adapted to selectively engage said gear wheels, the gear wheels on the intermediate shaft in mesh with said gear wheels, an intermediate gear wheel suitably journaled, a gear wheel on the driven shaft in mesh with said intermediate gear wheel, and a gear wheel slidable on the intermediate shaft to engage and disengage said intermediate gear wheel.

In testimony whereof I affix my signature in presence of two witnesses.

CLAUDE E. DORSEY.

Witnesses:
D. V. WRIGHT,
W. W. SANDERS.